No. 799,680. PATENTED SEPT. 19, 1905.
J. A. SLOAN.
MECHANISM FOR CUTTING TILES.
APPLICATION FILED AUG. 9, 1904.
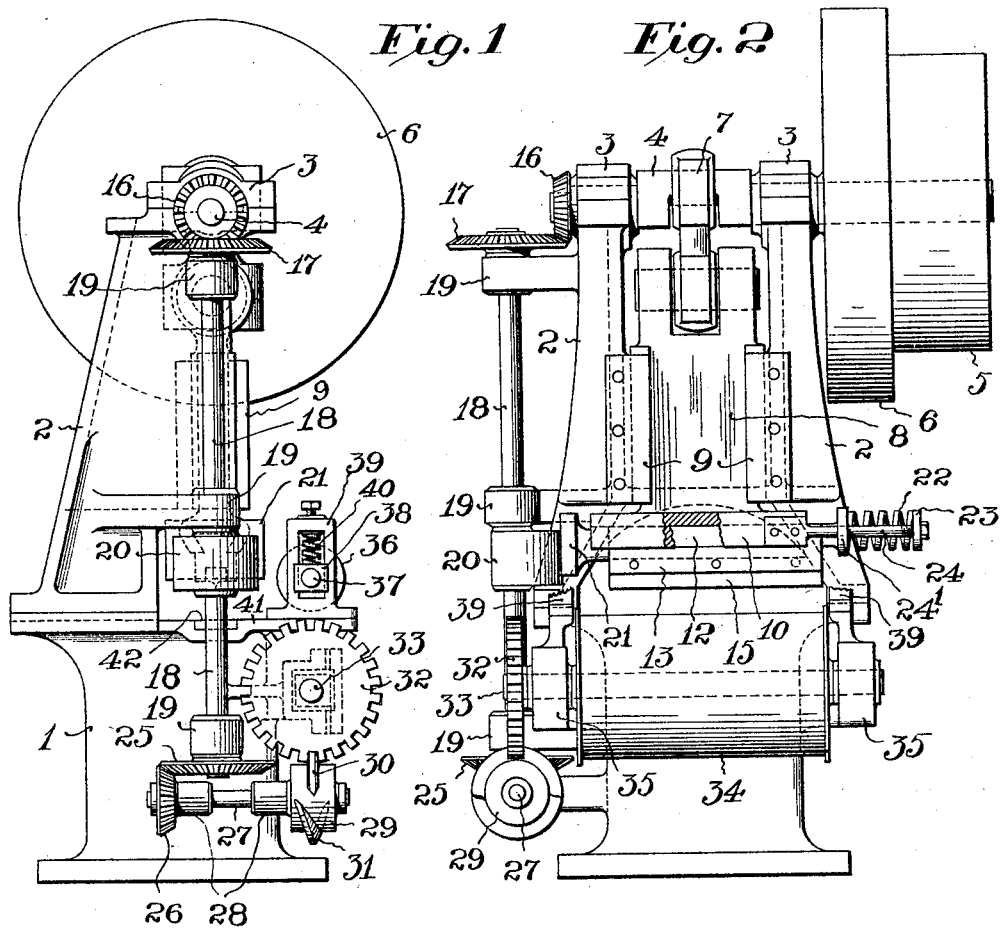
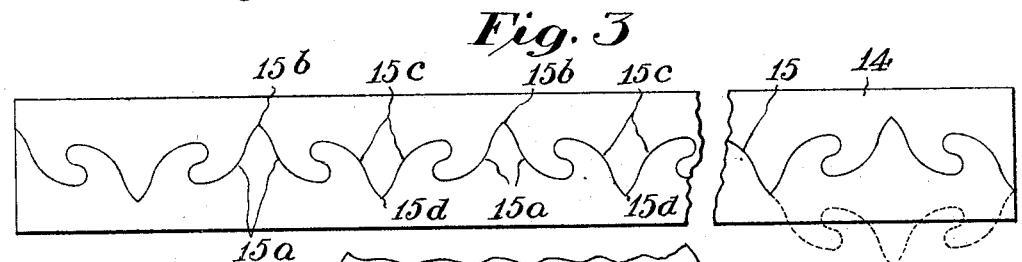
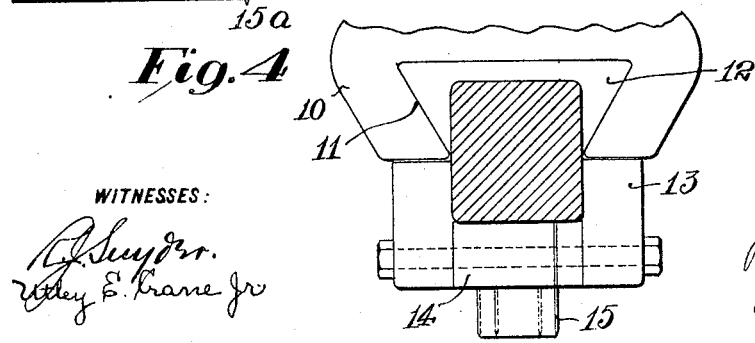
WITNESSES:
INVENTOR
John A. Sloan
BY
Chas. N. Butler
ATTORNEY.

UNITED STATES PATENT OFFICE.

JOHN A. SLOAN, OF TRENTON, NEW JERSEY.

MECHANISM FOR CUTTING TILES.

No. 799,680.                 Specification of Letters Patent.              Patented Sept. 19, 1905.

Application filed August 9, 1904. Serial No. 220,070.

*To all whom it may concern:*

Be it known that I, JOHN A. SLOAN, a citizen of the United States, residing at Trenton, in the county of Mercer and State of New Jersey, have invented certain Improvements in Mechanism for Cutting Tiles, of which the following is a specification.

In the manufacture of tiles for covering floors and the like the operations of molding and punching by which they have been produced are unsatisfactory in many regards, being slow and wasteful or expensive. Particularly in the manufacture of rubber tiles the operation of punching produces a wedging effect due to stretching the material, forming shapes that do not fit together as desired and producing considerable waste, while in molding variations desired in the thickness of the shapes, as well as in the configuration, require new sets of molds. The present invention is designed to overcome these defects, being adapted for rapidly cutting without waste sheeted material into shapes that will join together perfectly in interlocking relation.

In the accompanying drawings, Figure 1 represents an end view of a machine embodying my invention. Fig. 2 represents a front elevation thereof, parts being broken away for the purpose of illustration. Fig. 3 is a plan view in illustration of the knife, and Fig. 4 represents an end elevation and partial sectional view of the knife and the mechanism for carrying it.

As shown in the drawings, the frame-base 1 supports the housings 2, having the bearings 3, in which is journaled the crank-shaft 4, driven by the pulley 5, and the fly-wheel 6 thereon. The crank-shaft is connected by a link 7 with a ram 8, adapted to reciprocate in the guideways 9 of the housings. The ram-head 10 has therein the dovetail slot 11, which engages and provides a guide for the dovetail slide 12, movable therein and supporting the seat 13 for holding the knife-bar 14 and the blade 15.

A bevel-pinion 16 is fixed on the end of the crank-shaft 4 and engages the bevel spur-wheel 17, fixed on the shaft 18, which is journaled in bearings 19, carried by the frame.

Fixed to and revolving with the shaft 18 is a cam 20, against which the bearing 21, connected with the knife-seat 13, is constantly pressed by the spring 22. The spring has its outer end supported by a bearing 23, fixed to the ram-head 10 by a rod connection 24, and its inner end pressing against the bearing 24', connected to the knife-seat and sliding on the rod connection 24.

A bevel spur-wheel 25 is fixed to the shaft 18 and engages a bevel-pinion 26, fixed on a shaft 27, which is journaled in bearings 28 on the frame. The shaft 27 has fixed thereon a hub 29, on the periphery of which are the plain rib or thread 30 and the helical rib or thread 31, adapted for engaging the toothed wheel 32, the latter being fixed on the spindle 33 of the roller 34, which is journaled in the frame-supported bearings 35.

A roll 36, coacting with the roll 34, has its spindle 37 journaled in bearing-blocks 38, held in the housings 39 and pressed down by the springs 40. The rolls feed to the table 41, having therein the knife-bed 42 of suitable material for supporting the fabric and receiving the impact of the knife-blade.

In the operation of the machine the revolving crank-shaft 4 effects the reciprocation of the ram 8 and the rotation of the shaft 18, the ram reciprocating the knife-blade 15 vertically and the cam 20 and spring 24 shifting the knife horizontally in opposite directions at the alternate vertical strokes. The rotating shaft 18 effects the rotation of the shaft 27 and the threads 30 and 31, the thread 30 holding the toothed wheel 32 at each descent of the knife to shear the fabric and the thread 31 advancing the toothed wheel while the knife is in the upper part of its stroke. Thus the feeding-rolls 34 and 36 are given an intermittent movement, which feeds the fabric forward while the knife is elevated and holds it while the knife is down.

The purpose of reciprocating the knife-blade 15 horizontally will appear from the fact that its outline comprises reverse curves $15^a$, intersecting at the points $15^b$, and the similar reverse curves $15^c$, intersecting at the points $15^d$. Hence when a cut has been made through the sheeted fabric by a downward stroke of the blade, upon the advance by the feed-rolls of the fabric through a step and the lateral shifting of the blade, the points $15^a$ of the descending blade will register with the points of previous incision cut by the points $15^d$, cutting from the fabric a row of tiles each having curves $15^a$ and $15^c$ symmetrically located with reference to axes at right angles to each other.

Having described my invention, I claim—

1. In a machine of the class described, a reciprocating knife, a stationary bed against which said knife acts, means for reciprocating said knife, means for shifting said knife transversely to the direction of its said reciprocating movement and feeding mechanism connected therewith comprising an intermittently-acting feed-roll for engaging and advancing the material to be operated upon by said knife, substantially as specified.

2. In a machine of the class described, a knife having an irregular outline, means for reciprocating said knife and means for shifting it back and forth transversely to the direction of said reciprocating movement, and a stationary bed for supporting material to be cut by said knife in combination with automatically-operating feed-rolls for advancing material to said knife, said bed supporting the material on both sides of said knife, substantially as specified.

3. In a machine of the class described, a reciprocating ram, a shearing device having a transverse sliding connection with said ram, a revolving shaft, a cam on said shaft for shifting said shearing device in alternation with the reciprocations of said ram, and a feed-roll connected with and operated by said shaft, substantially as specified.

4. In a machine of the class described, a ram, a rotating shaft having means for reciprocating said ram, a knife of irregular outline having a sliding connection with said ram, a cam connected with said knife for shifting it in its said sliding connection, a rotating shaft connected with said cam and operated by said first shaft, and feeding mechanism connected with and operated by said cam-shaft, substantially as specified.

5. In a machine of the class described, a reciprocating ram, a shearing device having a sliding connection with said ram, a crank-shaft connected with said ram for reciprocating it, a cam-shaft connected with said shearing device for shifting it, means for connecting said shafts in coöperative relation, a feed-roll, and mechanism operated by said cam-shaft for intermittently operating said feed-roll substantially as specified.

6. In a machine of the class described, a vertically-reciprocating guide, a slide reciprocating in said guide, a shearing device connected with said slide, a cam connected with said slide for shifting said shearing device, a rotating shaft connected with said cam, a second rotating shaft operated by said first rotating shaft, a feed-roll, and a worm and wheel connecting said second shaft and roll substantially as specified.

7. In a machine of the class described, a pair of feed-rolls, a toothed wheel connected with one of said rolls, a plain and a helical thread revolved in alternating engagement with said wheel, a reciprocating knife, a bed for supporting material to be shorn by said knife on either side thereof, and mechanism for operating said knife and said threads in synchronous relation, substantially as specified.

8. In a machine of the class described, a pair of feed-rolls, a toothed wheel connected with one of said rolls, a straight and a helical thread alternately engaging the teeth of said wheel, a vertically-reciprocating support, a knife having a horizontally-sliding connection with said support, and mechanism connecting said threads with said support and said knife whereby said feed-rolls and said knife are operated in synchronous relation, substantially as specified.

9. In a machine of the class described, a pair of feed-rolls, a toothed wheel connected with one of said rolls, a straight and a helical thread alternately engaging with the teeth of said wheel, a rotating shaft connected with and revolving said threads, a second rotating shaft connected with and operating said first shaft, a cam on said second shaft, a knife connected with and reciprocated by said cam, a guide in which said knife reciprocates, a ram for reciprocating said guide, a crank-shaft connected to and reciprocating said ram, and mechanism connecting said crank-shaft with said cam-shaft, substantially as specified.

In testimony whereof I have hereunto set my hand, this 8th day of August, 1904, in the presence of the subscribing witnesses.

JOHN A. SLOAN.

Witnesses:
C. W. Downs,
Archibald Updike.